United States Patent
Lang

(10) Patent No.: US 7,543,508 B2
(45) Date of Patent: Jun. 9, 2009

(54) ZERO CROSSING DETECTION OF AN ULTRASONIC SIGNAL WITH VARIABLE THRESHOLD VALUE

(75) Inventor: Tobias Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 10/585,049

(22) PCT Filed: Jan. 26, 2005

(86) PCT No.: PCT/EP2005/050319

§ 371 (c)(1),
(2), (4) Date: Jun. 29, 2006

(87) PCT Pub. No.: WO2005/093379

PCT Pub. Date: Oct. 6, 2005

(65) Prior Publication Data

US 2008/0190213 A1   Aug. 14, 2008

(30) Foreign Application Priority Data

Mar. 25, 2004   (DE) ................. 10 2004 014 674

(51) Int. Cl.
*G01F 1/66* (2006.01)
(52) U.S. Cl. .................................. 73/861.28
(58) Field of Classification Search ............. 73/861.25, 73/861.27, 861.28, 861.29
See application file for complete search history.

(56) References Cited

U.S. PATENT DOCUMENTS

| 4,080,574 A | | 3/1978 | Loosemoire et al. | |
| 4,122,713 A | * | 10/1978 | Stasz et al. | 73/861.25 |
| 4,324,258 A | * | 4/1982 | Huebscher et al. | 73/861.25 |
| 4,515,021 A | * | 5/1985 | Wallace et al. | 73/861.27 |
| 5,448,222 A | * | 9/1995 | Harman | 340/566 |
| 6,606,916 B2 | * | 8/2003 | Bignell et al. | 73/861.27 |
| 6,634,240 B1 | * | 10/2003 | Wallen | 73/861.28 |
| 6,766,276 B1 | | 7/2004 | Dury | |

FOREIGN PATENT DOCUMENTS

| EP | 0 981 201 | 2/2000 |
| FR | 2 803 383 | 7/2001 |

\* cited by examiner

*Primary Examiner*—Harshad Patel
(74) *Attorney, Agent, or Firm*—Michael J. Striker

(57) ABSTRACT

An ultrasonic flow sensor having at least one ultrasonic converter (A, B) for transmitting and receiving ultrasonic signals (A0, B0) and a receiver unit (4) that is connected to the ultrasonic converter (A, B) and determines a zero crossing (N) of the ultrasonic signal (A0, B0) as a reception time ($t_o$) once the ultrasonic signal (A0, B0) has exceeded a predetermined threshold value (SW). The measurement precision can be significantly improved if the receiver unit (4) determines a piece of information about an amplitude (Amp) of the ultrasonic signal (A0, B0) and varies the threshold value (SW) based on the information determined.

7 Claims, 4 Drawing Sheets

ZERO CROSSING DETECTION OF AN ULTRASONIC SIGNAL WITH VARIABLE THRESHOLD VALUE

CROSS-REFERENCE TO A RELATED APPLICATION

The invention described and claimed hereinbelow is also described in German Patent Application DE 10 2004 014 674.18filed on Mar. 25, 2004. This German Patent Application provides the basis for a claim of priority of invention under 35 U.S.C. 119(a)-(d).

BACKGROUND OF THE INVENTION

The present invention relates to an ultrasonic flow sensor, and to a method for detecting the reception time of an ultrasonic signal.

Ultrasonic flow sensors are in particular used to measure the volumetric flow, mass flow, or flow velocity of a gaseous or fluid medium flowing through a conduit. A known type of ultrasonic flow sensor includes two ultrasonic converters offset from each other in the flow direction, each of which generates ultrasonic signals and transmits them to the other respective ultrasonic converter. The ultrasonic signals are received by the respective other converters and evaluated by electronics provided. The travel time difference between the signal traveling in the flow direction and the signal traveling counter to the flow direction is a measure for the flow velocity of the fluid. This can be used to calculate the desired measurement quantity, e.g. a volumetric flow or mass flow.

FIG. 1 shows a typical arrangement of an ultrasonic flow sensor equipped with two ultrasonic converters A, B that are situated in a conduit 3 and spaced apart from each other by a distance L. Inside the conduit 3, a fluid 1 flows at a velocity v in the direction of the arrow 2. The measurement path L is inclined at an angle α in relation to the flow direction 2. During a measurement, the ultrasonic converters A, B send each other to ultrasonic signals, which are either decelerated or accelerated depending on the direction of the flow. The travel times of the acoustic signals here are a measure for the flow velocity to be determined.

FIG. 2 shows a very simplified schematic depiction of a converter arrangement with a set of control and evaluation electronics 4 attached to it. For example, the flow sensor can function in accordance with the so-called "sing-around" method. In this case, the reception of an ultrasonic signal A0 or B0 in one of the converters A, B immediately triggers an ultrasonic signal in the opposite direction.

In order to measure the travel time of an ultrasonic signal A0 or B0, it is crucial to be able to clearly and precisely determine the reception time of an ultrasonic signal A0, B0. A method known from the prior art for determining the reception time will be explained below in conjunction with FIG. 3.

FIG. 3 shows the signal course of a single ultrasonic signal A0, B0. The "reception time" of the signal A0, B0 is defined here as the first zero crossing $N_0$ of the signal after the signal amplitude Amp has exceeded a predetermined threshold value SW (the so-called pretrigger level). In the example shown, therefore, the time $t_0$ would be the reception time of the signal. (The reception time of the signal could alternatively also be determined by evaluating the phase of the signal.)

Contamination, drifting, or aging of the ultrasonic converters, or turbulence in the flowing fluid can cause the amplitude of the ultrasonic signals A0, B0 to vary greatly. If the signal amplitude does not vary too greatly, then there is hardly any interference with zero crossing detection because the same zero crossing is always detected as the reception time and the frequency of the signal remains essentially the same. But as soon as the maximum amplitude of the half-wave approaches the range of the threshold value SW before the time $t_0$, then erroneous measurements of the reception time can occur, for example, if the ultrasonic signal exceeds the threshold value at a later time, consequently causing a false zero crossing to be detected as the reception time.

The object of the present invention, therefore, is to improve the measurement precision of an ultrasonic flow sensor that determines the reception time of an ultrasonic signal by means of zero crossing detection.

This object is obtained according to the present invention by means of the defining characteristics disclosed in claim 1 and claim 7. Other embodiments of the present invention are the subject of the dependent claims.

An essential concept of the invention is comprised of determining a piece of information about the amplitude of the ultrasonic signal and adapting the threshold value (pretrigger value) to the amplitude of the ultrasonic signal. This makes it possible, in the event of an altered signal amplitude, to always be able to detect the correct, i.e. same, zero crossing or the correct event as the reception time.

There are various ways to determine a piece of information about the signal amplitude: a first possibility consists of measuring a signal maximum, preferably the maximum amplitude of the ultrasonic signal, by means of a corresponding device. Another possibility consists of rectifying the ultrasonic signal and determining an average value. This average value is also a measure for the signal amplitude and can consequently be used as a reference value for adapting the threshold value. In addition, many other signal evaluation methods are conceivable for obtaining a piece of information about the signal amplitude.

According to a preferred embodiment of the present invention, the receiver unit of the ultrasonic flow sensor includes a device for measuring the maximum amplitude of the ultrasonic signal. The threshold value can thus be adapted to the current maximum signal amplitude. This sharply reduces the occurrence of erroneous measurements.

A preferred embodiment form of the amplitude measurement device includes a first S/H stage (scan and hold component), which is supplied at its input with the ultrasonic signal or with a corresponding converter output signal and stores the maximum value of the signal amplitude, and a subsequent second S/H stage, which adopts and stores the maximum value of the first S/H stage. The maximum amplitude value thus determined can then be used to generate a desired threshold value (pretrigger level).

To this end, the output signal of the second S/H stage is divided by a voltage divider and the partial voltage (=threshold value) is supplied to a comparator. The comparator preferably switches its output when the converter output signal exceeds the threshold value. After this, the zero crossing detection can then be executed.

In order to prevent the threshold value from fluctuating too much, a low-pass filter is preferably provided, which filters the amplitude information or the threshold value information (i.e. the corresponding signal).

Another embodiment form of the receiver unit includes a rectifier that rectifies the converter output signal. The rectified signal can, for example, be integrated by means of an integrator or filtered by means of a low-pass. The integrator output signal or filter output signal, in turn, allows inferences to be drawn about the signal amplitude of the ultrasonic signal, thus making it possible to adapt the threshold value.

Another embodiment form of the receiver unit includes a differentiator that differentiates the converter output signal as well as a subsequent zero crossing detection unit, which detects the times of the maxima of the ultrasonic signal. The maxima can, for example, be stored in an S/H stage and the maximum with the highest value can be determined from among them.

Another embodiment form of the receiver unit includes two lock-in amplifiers in which the converter output signal is amplified using two reference clock signals; the reference clock signals, respectively, have the frequency of the ultrasonic signals and the opposite frequency, e.g. are phase-shifted by pi/2. If the two amplifier output signals thus produced are integrated or are filtered through a low-pass, then it is possible for the resulting signals $u_0$ and $u_{pi/2}$ to be quadratically averaged $$\sqrt{u_0^2 + u_{pi/2}^2}$$

to determine a value that represents a measure for the signal amplitude, thus permitting adaptation of the threshold value.

BRIEF DESCRIPTION OF THE DRAWINGS

Examples of the present invention will be explained in detail below in conjunction with the accompanying drawings.

Figure 1:
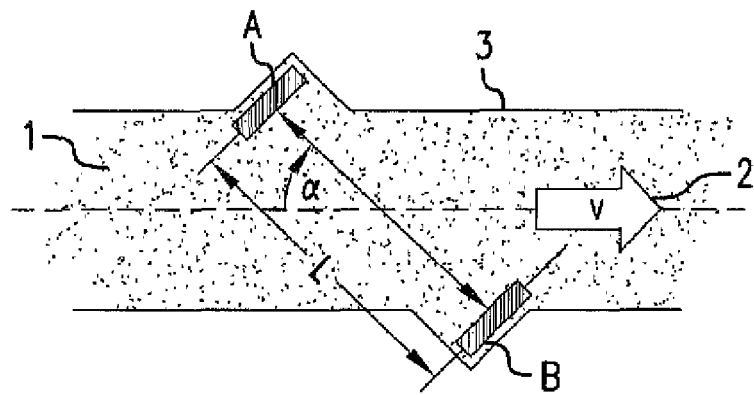
FIG. 1 shows an ultrasonic flow sensor known from the prior art, equipped with two ultrasonic converters.
Figure 2:
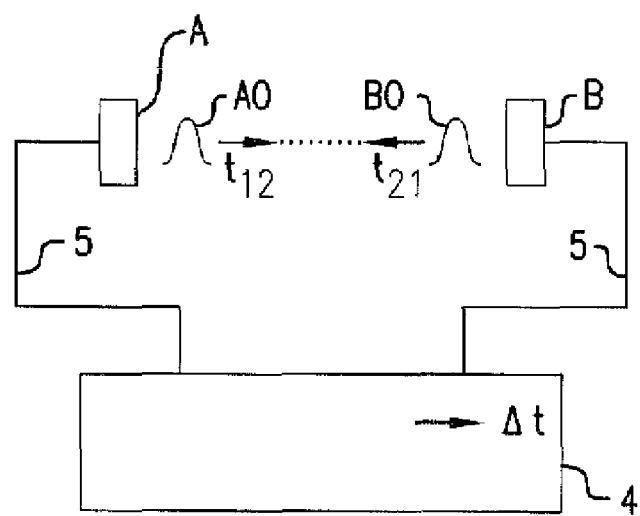
FIG. 2 shows an ultrasonic flow sensor with an accompanying control/receiver circuit.
Figure 3:
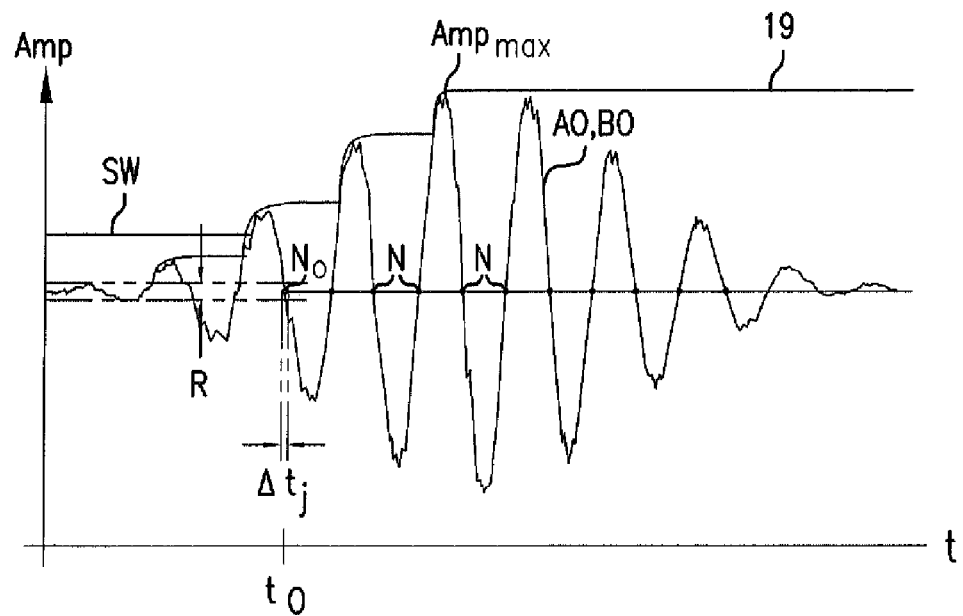
FIG. 3 shows the signal course of a single ultrasonic signal.

For explanation of FIGS. 1-3, the reader is referred to the introduction to the specification.

DESCRIPTION OF THE PREFERRED EMBODIMENTS

Figure 4:
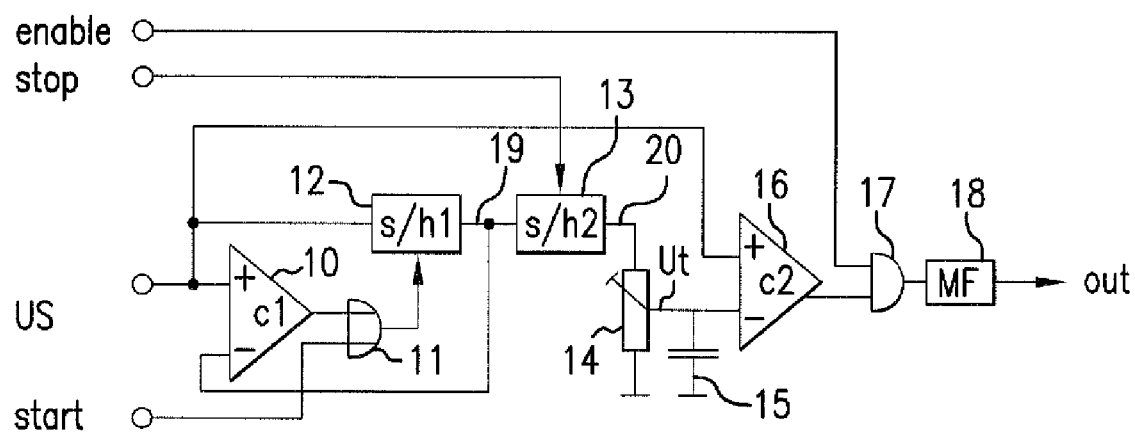
FIG. 4 shows a receiver unit for adapting the threshold value according to a first exemplary embodiment of the present invention.

FIG. 4 shows a part of a receiver unit 4 with which the threshold value SW can be adapted to the signal amplitude of the ultrasonic signals A0 and B0. In this embodiment form, the receiver unit 4 measures the maximum amplitude $Amp_{max}$ of the ultrasonic signal A0, B0.

The receiver unit 4 includes a first comparator 10, whose input US is supplied with the converter output signal 5 and whose other input is supplied with the output 19 of a first S/H stage 12. The comparator 10 switches its initial state when the converter output signal 5 exceeds the amplitude value previously stored in the S/H stage 12. This activates the first S/H stage 12, which then adopts and stores the current amplitude value. FIG. 3 shows the course of the output signal 19 of the first S/H stage 12.

When the ultrasonic signal A0 or B0 has decayed, then a second S/H stage 13 adopts the maximum amplitude value $Amp_{max}$ of the first S/H stage 12. To achieve this, the second S/H stage 13 is triggered by a control signal "stop". The output signal 20 of the second S/H stage 13 is supplied to a voltage divider 14 with an adjustable division factor. The voltage divider 14 here is embodied in the form of a trimming potentiometer. The partial voltage $U_t$ here constitutes the new threshold value SW for the detection of the reception time.

The partial voltage $U_t$ is supplied to a second comparator 16 as a reference voltage. The other input of the comparator 16 is connected to the input US of the receiver unit 4. The output signal of the second comparator 16 consequently changes the switching state when the ultrasonic signal A0, B0 exceeds or falls below the threshold value SW. The switching state is stored in a monoflop 18.

Figure 5:
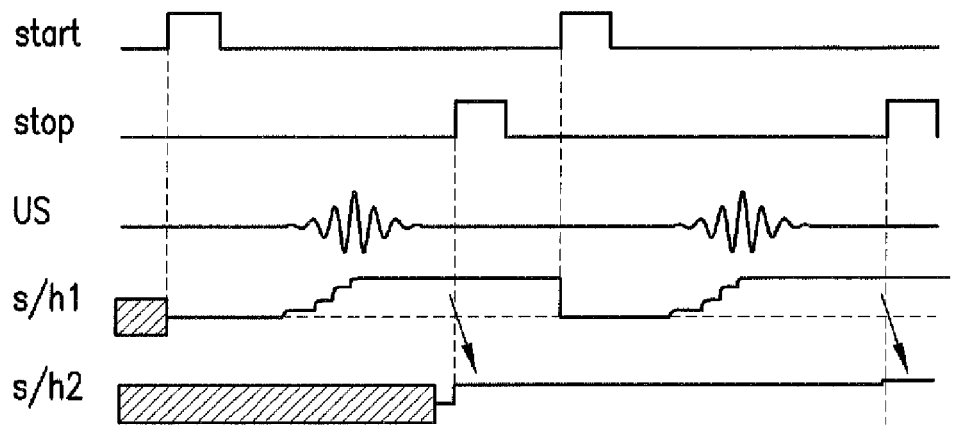
FIG. 5 shows a signal flowchart of the signals from FIG. 4.

FIG. 5 shows the signal course of several signals of the circuit from FIG. 4. The signal course is depicted as shaded wherever the corresponding signal either depends on prior events or the signal state is undefined.

The measurement process begins with the generation of a start signal "start", which is supplied via an OR gate 11 to the first S/H stage 12 in order to activate it. Upon reception of an ultrasonic signal A0, B0 at the input US, the first S/H stage 12 stores the maximum signal amplitude $Amp_{max}$ (signal s/h1), as has been explained above. Upon arrival of a stop signal "stop", the second S/H stage 13 adopts the value of the first S/H stage 12 (signal s/h2).

With the next start signal, the S/H stage 12 is reset again and a new measurement can begin.

Figure 6A:
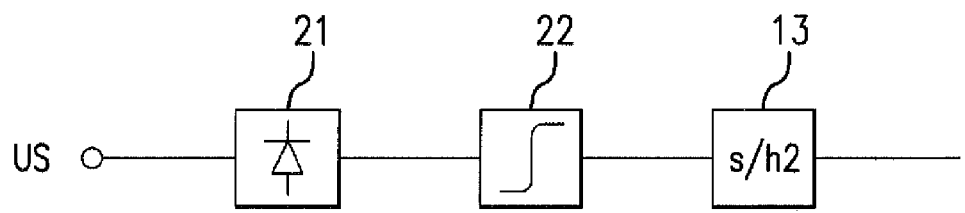
FIGS. 6a-6d show various embodiment forms of receiver units for adapting the threshold value.

FIG. 6a shows another embodiment form of a receiver unit 4 in which the converter output signal is first supplied to a rectifier 21. The output signal of the rectifier 21 is then integrated by means of an integrator 22, in which an average value of the signal is generated. This value is consequently a measure for the maximum amplitude of the ultrasonic signal A0, B0. The integrator output signal is then scanned and stored by the second S/H stage 13. The rest of the circuit for generating the partial voltage $U_t$ can be embodied identically to the one in FIG. 4.

Figure 6B:
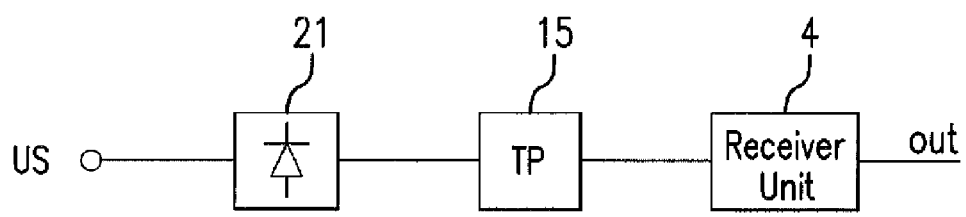

FIG. 6b shows another embodiment form of a receiver unit 4 equipped with a rectifier 21 and a subsequent low-pass 15. The rectified and filtered converter output signal 5 can once again be evaluated by means of the circuit from FIG. 4.

Figure 6C:
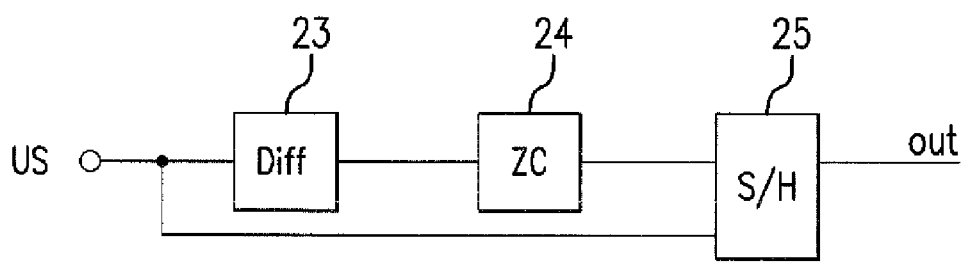

FIG. 6c shows an additional, different embodiment form of a receiver unit 4 equipped with a differentiator 23 and a zero crossing detection unit 24. The differentiator 23 and the unit 24 are used to determine the times of the signal maxima of the ultrasonic signal A0, B0 and a subsequent S/H stage 25 is activated, which adopts the respective maximum signal values. In order to prevent lower amplitude values from being adopted again when the ultrasonic signal A0, B0 decays, the number of scanning actions of the S/H stage 25 can be limited, e.g. by a counter or a monoflop.

Figure 6D:
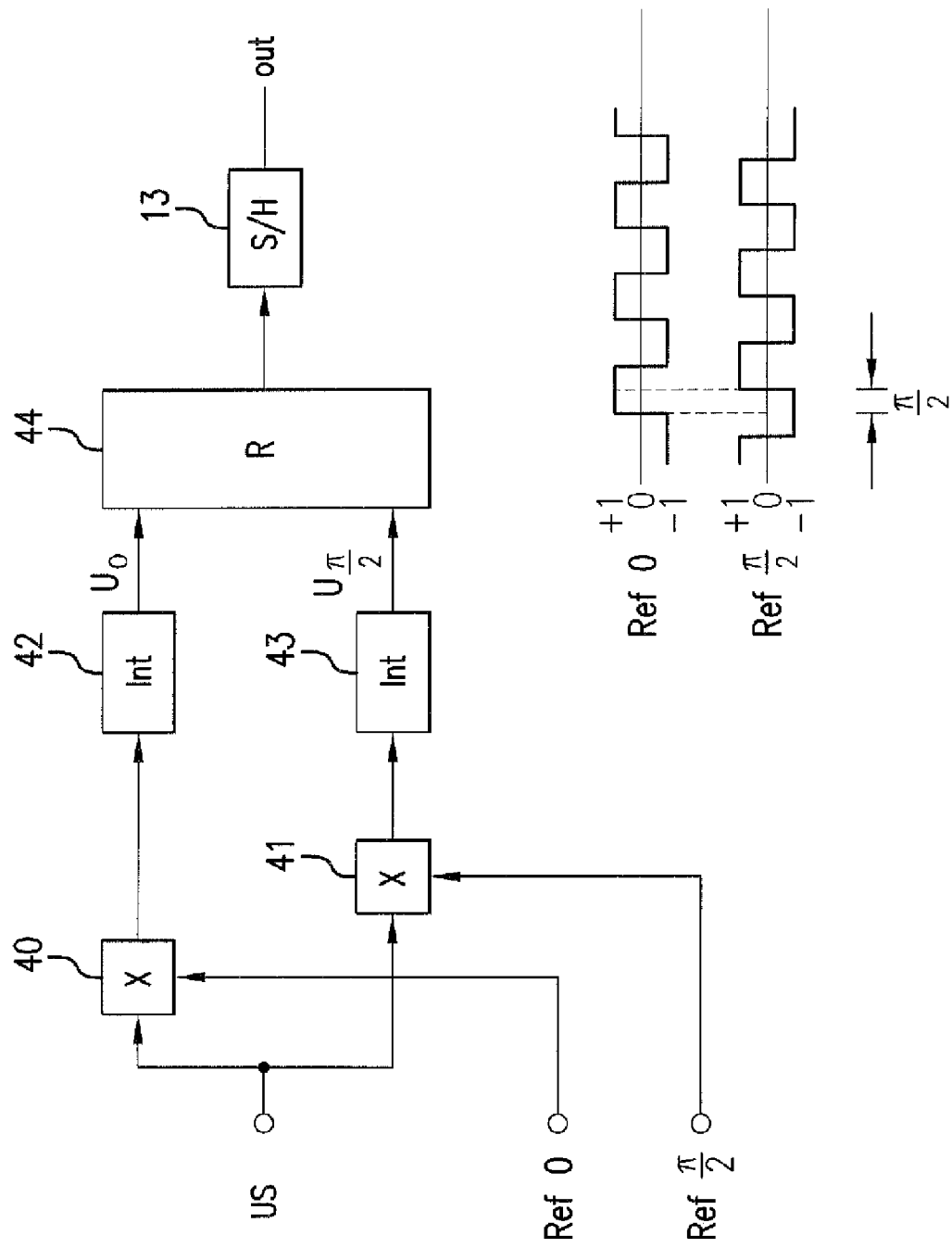

FIG. 6d shows yet another embodiment form of a receiver unit 4 equipped with two lock-in amplifiers 40, 42 and 41, 43. The lock-in amplifiers can be embodied, for example, in the form of multipliers 40, 41 equipped with subsequent integration units 42, 43. In this instance, the ultrasonic signal A0, B0 is inverted in a phase-controlled manner by means of the reference clock pulses $Ref_0$ and $Ref_{pi/2}$, which are precisely at the ultrasonic frequency. Another possibility, for example, consists of respectively replacing the two multipliers with an inverting amplifier and a non-inverting amplifier, whose amplification factors are essentially the same, except for their sign. In this instance, a signal multiplexer, for example, would be used to switch back and forth between the inverting and non-inverting mode in accordance with the reference clock pulses. The reference clock pulses in this case are phase-shifted by pi/2. The resulting signals are then integrated, consequently generating the amplifier output signals $u_0$ and $u_{pi/2}$. As an alternative to integrating the signals, it is also conceivable, for example, to use a low-pass filtration. The signals $u_0$ and $u_{pi/2}$ are quadratically added using a digital or analog calculation circuit 44 and are scanned using an S/H stage 13. The output signal out of the circuit from FIG. 6$d$ is once again a measure for the amplitude of the ultrasonic signal and permits the threshold value SW ($U_t$) to be adapted. The rest of the circuit for generating the partial voltage $U_t$ can be embodied identically to the one in FIG. 4.

The dynamic behavior of the receiver unit 4 can also be influenced by means of suitable filters. A low-pass filter, for example, prevents excessively rapid adaptations of the threshold value SW. Such a low-pass filter could be embodied, for example, in the form of an RC element that is interposed between the second S/H stage 13 and the trimming potentiometer 14. Optionally, the low-pass filter 15 could also be interposed between the trimming potentiometer and the second comparator 16.

Reference Numeral List

| | |
|---|---|
| 1 | fluid |
| 2 | flow direction |
| 3 | conduit |
| 4 | control/receiver unit |
| 5 | converter output signal |
| 10 | first comparator |
| 11 | OR gate |
| 12 | first S/H stage |
| 13 | second S/H stage |
| 14 | voltage divider |
| 15 | low-pass filter |
| 16 | second comparator |
| 17 | AND gate |
| 18 | monoflop |
| 19 | output of first S/H stage 12 |
| 20 | output of second S/H stage 13 |
| 21 | rectifier |
| 22 | integrator |
| 23 | differentiator |
| 24 | zero crossing detection unit |
| 25 | S/H stage |
| 40, 41 | multiplier |
| 42, 43 | integrator |
| 44 | calculation unit |
| Ref$_0$, Ref$_{pi/2}$ | reference clock signals |
| $t_0$ | reception time |
| SW | threshold value |
| A0, B0 | ultrasonic signals |
| A, B | ultrasonic converter |
| L | measurement path |
| $U_t$ | partial voltage |

What is claimed is:

1. An ultrasonic flow sensor having
   at least one ultrasonic converter (A, B) for transmitting and receiving ultrasonic signals (A0, B0) and
   a receiver unit (4) that is connected to the ultrasonic converter (A, B), monitors when the ultrasonic signal (A0, B0) exceeds a predetermined threshold value (SW), and, depending on this event, determines a reception time ($t_0$) of the ultrasonic signal (A0, B0), wherein the receiver unit (4) determines a piece of information about the amplitude (Amp) of the ultrasonic signal (A0, B0) and adapts the threshold value (SW) based on the information determined; wherein the receiver unit (4) has a first S/H stage (12), whose input (US) is supplied with a converter output signal (5), and a subsequent second S/H stage (13), which adopts and stores the maximum value (Amp$_{max}$) of the first S/H stage (12).

2. The ultrasonic flow sensor as recited in claim 1,
   wherein a voltage divider (14) is provided, which divides the output signal (20) of the second S/H stage (13), and a comparator (16) is provided, which is supplied with the partial voltage from the voltage divider (14).

3. The ultrasonic flow sensor as recited in claim 1,
   wherein a low-pass filter (15) is provided, which filters the piece of information about the signal amplitude (Amp$_{max}$) or a piece of information ($U_t$) derived from it.

4. The ultrasonic flow sensor as recited in claim 1,
   wherein the receiver unit (4) has a rectifier (21) that rectifies the converter output signal (5).

5. The ultrasonic flow sensor as recited in claim 1,
   wherein the receiver unit (4) has a differentiator (23), which is supplied with the converter output signal (5), and has a subsequent zero crossing detection unit (24).

6. A method for detecting the reception time ($t_0$) at which an ultrasonic signal (A0, B0) is received in an ultrasonic converter (A, B), using a receiver unit (4) that monitors when the ultrasonic signal (A0, B0) exceeds a predetermined threshold value (SW) and, depending on this event, determines a reception time ($t_0$) of the ultrasonic signal (A0, B0),
   wherein the receiver unit (4) determines a piece of information about an amplitude (Amp) of the ultrasonic signal (A0, B0) and the threshold value (SW) is adapted as a function of the determined information (Amp), wherein a first S/H stage (12) stores the maximum amplitude value (Amp$_{max}$) of the ultrasonic signal (A0, B0) and a second S/H stage (13) scans and stores the maximum value (Amp$_{max}$) of the first S/H stage (12).

7. The method as recited in claim 6,
   wherein the amplitude information (Amp, out) is obtained from the output signal ($u_0$, $u_{pi/2}$) of two lock-in amplifiers (41, 42; 41, 43).

* * * * *